(12) United States Patent
Campbell

(10) Patent No.: US 6,193,885 B1
(45) Date of Patent: Feb. 27, 2001

(54) POOL CLEANER DEBRIS BAG

(75) Inventor: Sanford F. Campbell, Redding, CA (US)

(73) Assignee: Letro Products, Inc., Redding, CA (US)

(*) Notice: Subject to any disclaimer, the term of this patent is extended or adjusted under 35 U.S.C. 154(b) by 0 days.

(21) Appl. No.: 09/211,025

(22) Filed: Dec. 14, 1998

(51) Int. Cl.⁷ .................................................. B01D 29/27
(52) U.S. Cl. ....................... 210/242.1; 210/460; 210/495; 210/499; 15/1.7
(58) Field of Search ................................ 210/242.1, 460, 210/495, 499; 15/1.7

(56) References Cited

U.S. PATENT DOCUMENTS

| D. 279,227 | 6/1985 | Price . |
| D. 288,373 | 2/1987 | Alanis . |
| D. 310,774 | 9/1990 | Collins et al. . |
| D. 311,796 | 10/1990 | Collins . |
| D. 376,450 | 12/1996 | Campbell et al. . |
| D. 379,693 | 6/1997 | Campbell et al. . |
| 2,989,185 | * 6/1961 | Lombardi ........................... 210/242.1 |
| 3,251,390 | 5/1966 | Evans . |
| 3,722,686 | * 3/1973 | Arnett et al. ....................... 210/242.1 |
| 3,767,055 | * 10/1973 | Flatland ............................ 210/242.1 |
| 3,822,754 | 7/1974 | Henkin et al. . |
| 3,936,899 | 2/1976 | Henkin et al. . |
| 4,344,274 | 8/1982 | Hesimann . |
| 4,498,190 | 2/1985 | Garlick, III . |
| 4,503,559 | 3/1985 | Warnke . |
| 4,558,479 | 12/1985 | Greskovics et al. . |
| 4,630,312 | 12/1986 | Milstein . |
| 4,856,913 | 8/1989 | Campbell . |
| 4,880,531 | * 11/1989 | Blake et al. ............................. 15/1.7 |
| 4,889,622 | * 12/1989 | Newcombe-bond .............. 210/242.1 |
| 5,077,853 | 1/1992 | Campbell . |
| 5,173,181 | 12/1992 | McFarland . |
| 5,603,135 | 2/1997 | Jones et al. . |
| 5,893,188 | 4/1999 | Campbell et al. . |

FOREIGN PATENT DOCUMENTS

| 646056 | 6/1994 | (AU) . |
| 239016 | 7/1991 | (NZ) . |
| 91/5471 | 1/1993 | (ZA) . |

* cited by examiner

Primary Examiner—Matthew O. Savage
(74) Attorney, Agent, or Firm—Fliesler, Dubb, Meyer & Lovejoy LLP

(57) ABSTRACT

A pool cleaner debris bag comprising a body having an upper end and a lower end, the lower end coupled to the pool cleaner to receive debris from the pool ejected by the cleaner into the bag, and a float positioned in the bag.

9 Claims, 3 Drawing Sheets

POOL CLEANER DEBRIS BAG

BACKGROUND OF THE INVENTION

1. Field of the Invention

This invention relates generally to the field of automatic swimming pool cleaners, and in particular to a bag designed to collect the refuse and debris from the pool cleaner during operation of the unit.

2. Description of the Related Art

Automatic swimming pool cleaners for cleaning the floor and sidewalls of a swimming pool are well known.

There are generally four types of pool cleaners in the pool cleaning market: pressure or return side cleaners; suction cleaners; electric cleaners and in-floor cleaners.

Pressure or return side cleaners use a debris bag to collect debris in the pool. Water from a pump is fed into the cleaner to sweep and collect debris into the bag carried by the cleaner. This means that the bag itself has a weight, buoyancy, and a weight factor that changes when debris is collected in the bag. The cleaner must be able to traverse the entire pool without being toppled. Weight is added to the bag when debris is collected in the bag, changing the weight of the bag as the cleaner moves in the pool. In addition, when empty the bag may topple over to one side, and various methods of attaching the bag to the water supply have heretofore been used to ensure the bag remains upright so as not to impair performance of the cleaner.

In a pressure cleaner, the influx of water into the cleaner affects the manner in which the cleaner acts under water. The buoyancy of objects is also a significant consideration in developing pressure cleaners and is affected by the component in the cleaner and the water inflow and action of the water within the cleaner.

One particular type of known automatic pressure cleaner having four wheels is shown and described in co-pending U.S. Patent Ser. No. 08/741,957, and another three-wheel version in U.S. Pat. Nos. 3,822,754, 3,936,899, and 4,558,479.

FIG. 1 shows, by way of example, a first embodiment of an automatic swimming pool cleaner 10, such as that shown in U.S. Ser. No. 08/741,957, suitable for use with the present invention. Cleaner 10 includes a frame 12 on which a housing, consisting of an upper housing shell 14 and a lower housing shell 16, is mounted. An open suction mast 18 for vacuuming debris from beneath the cleaner 10 extends through an opening 20, generally in the middle of the upper housing shell 14, and a collection bag 22 is attached to the suction mast, over a flapper valve 24 positioned on the upper end of the suction mast, to collect the debris. A pair of opposing jets, located inside the suction mast 18 near its inlet at the bottom of the cleaner 10, induce a flow of water upwardly through the suction mast and into the collection bag 22 in well-known manner. When the cleaner 10 is operating, the force of the water pushes open the flapper valve 24; when the cleaner ceases operating, the flapper valve closes by virtue of gravity to keep the debris in the collection bag 22 from failing back into the swimming pool through the open suction mast 18.

Although not shown in FIG. 1, the bag 22 may be coupled to line 32 by a loop of material in order to keep the bag in the position generally shown in FIG. 1. Nevertheless, the bag may still have a tendency to flop over to one side or another. Accordingly, a need exists for an improved debris bag adapted for submerged travel in a pool with a pool cleaner. The present invention fulfills these and other needs.

SUMMARY OF THE INVENTION

Briefly, and in general terms, the invention comprises a pool cleaner debris bag comprising a body having an upper end and a lower end, the lower end coupled to the pool cleaner to receive debris from the pool ejected by the cleaner into the bag, and a float positioned in the bag.

BRIEF DESCRIPTION OF THE DRAWINGS

The invention will be described with respect to the particular embodiments thereof. Other objects, features, and advantages of the invention will become apparent with reference to the specification and drawings in which.

DETAILED DESCRIPTION OF THE PREFERRED EMBODIMENTS

Figure 2:
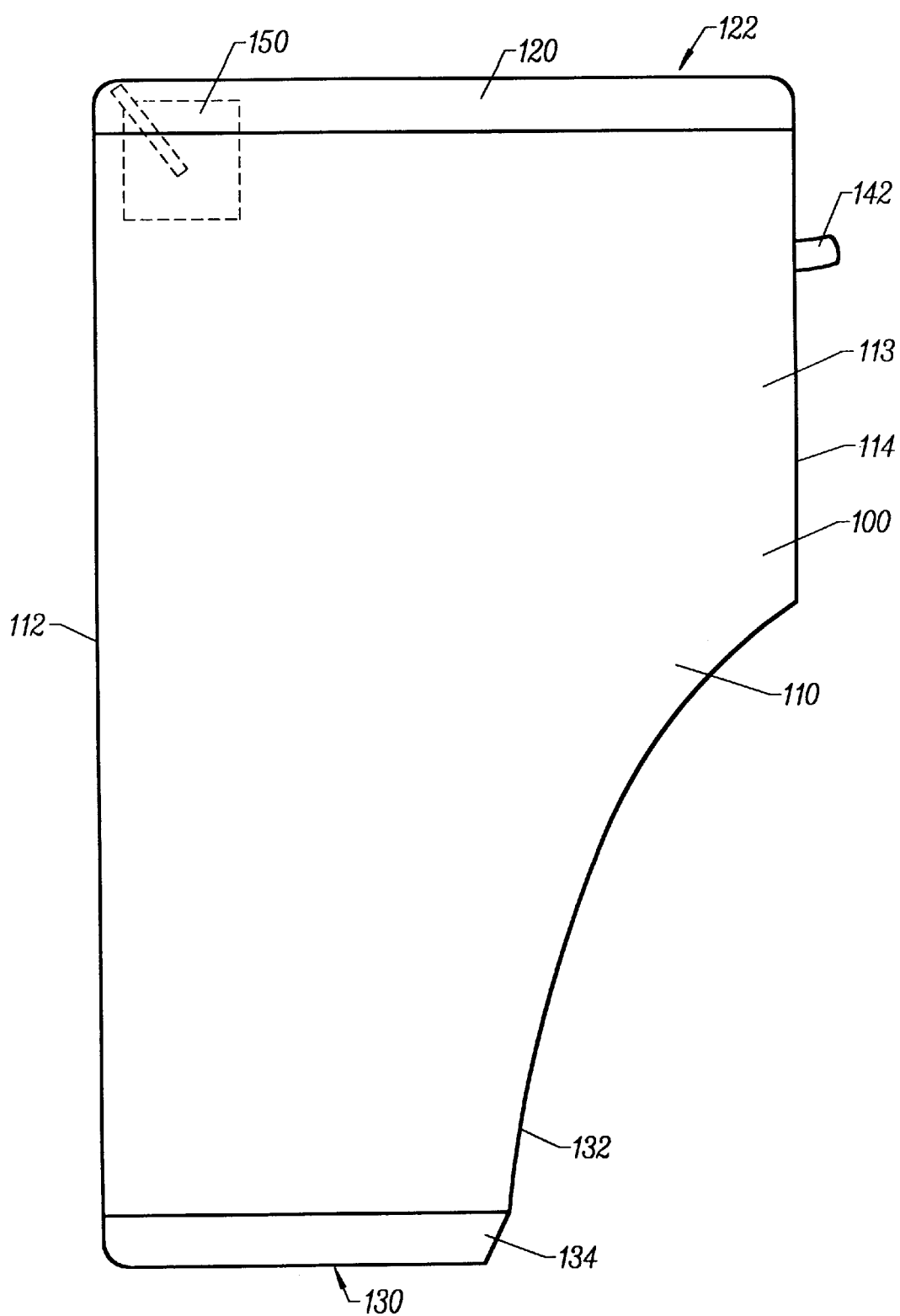
FIG. 2 is a plan view of a bag in accordance with the present invention.
Figure 3:
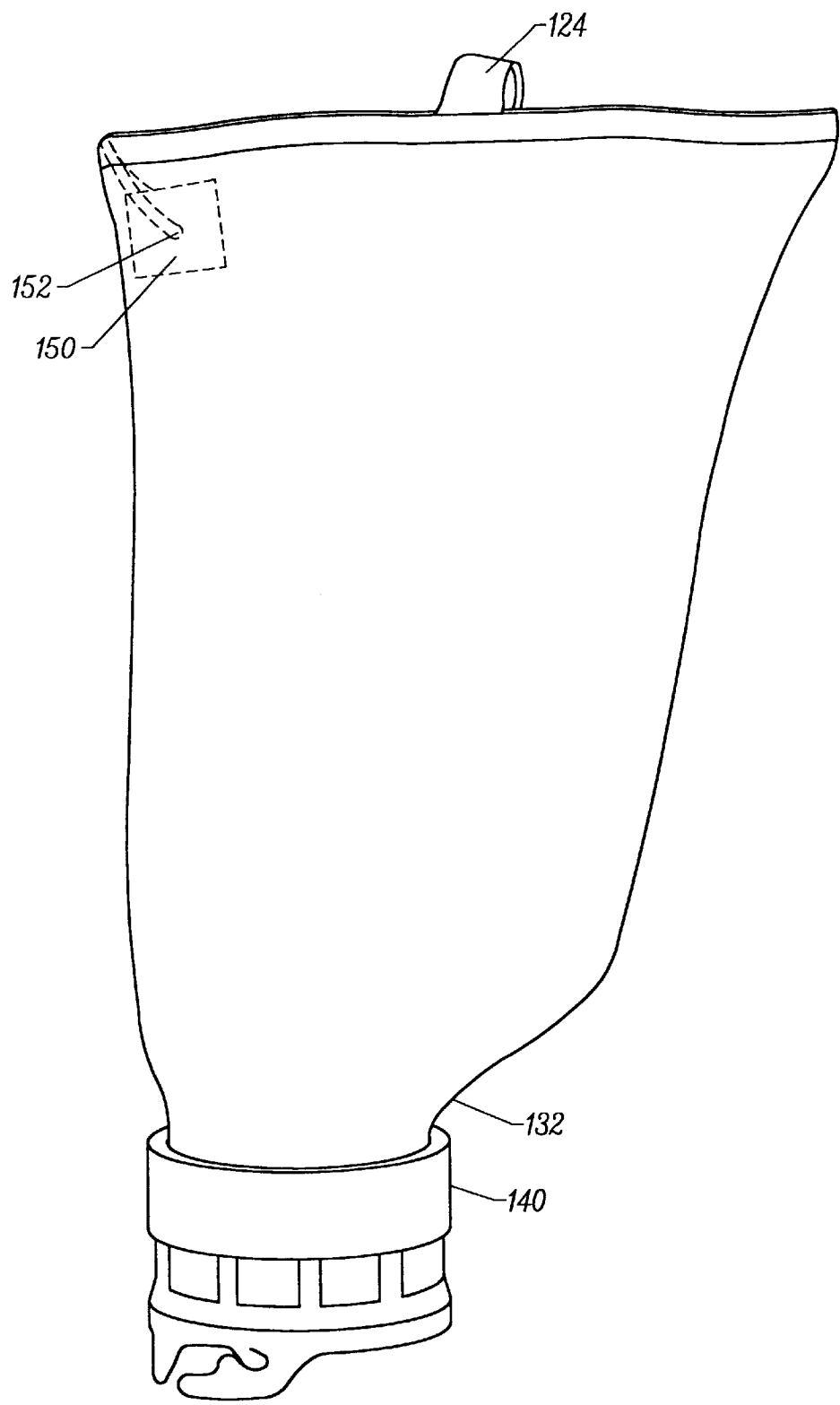
FIG. 3 is a perspective view of the bag of the present invention.

FIG. 2 shows a plan view and FIG. 3 a perspective view of a debris bag in accordance with the present invention. Bag 100 is substantially constructed of a porous material 110 which is chosen such that it is sufficiently porous to allow water or other liquid to pass therethrough relatively easily, while restricting the flow of most debris collected by pool sweeps and pool cleaners. The main portion of pool sweep bag 110 is constructed of a single piece of porous material 110 which is folded along the left side 112 and seamed and sewn together to form a vertical form 113 along right side 114. It should be noted that vertical seam 114 could be constructed to allow opening or closing thereof, however in this embodiment, vertical seam 114 is sewn and horizontal seam 120 constructed with velcro closures to allow opening thereof to remove debris.

Seam 120 is positioned at a top portion 122 of pool bag 100. Seam 120 is constructed by utilizing a velcro hook-type material or equivalent and a velcro loop-like material or equivalent to facilitate opening and closing thereof. Top portion 120 includes a strap 124 positioned to allow an individual to remove bag 100 from the pool sweep or cleaner by simply inserting a finger through the strap 124 and lifting. At bottom portion 130, a snout portion 132 is provided. A bottom seam 134 is shown in FIG. 2 constructed of a folded, sewn layer of the porous material. In FIG. 3, snout portion 132 is shown as mounted in a coupling 140 to allow bag 100 to be easily coupled to and decoupled from the pool sweep or pool cleaner.

Figure 1:
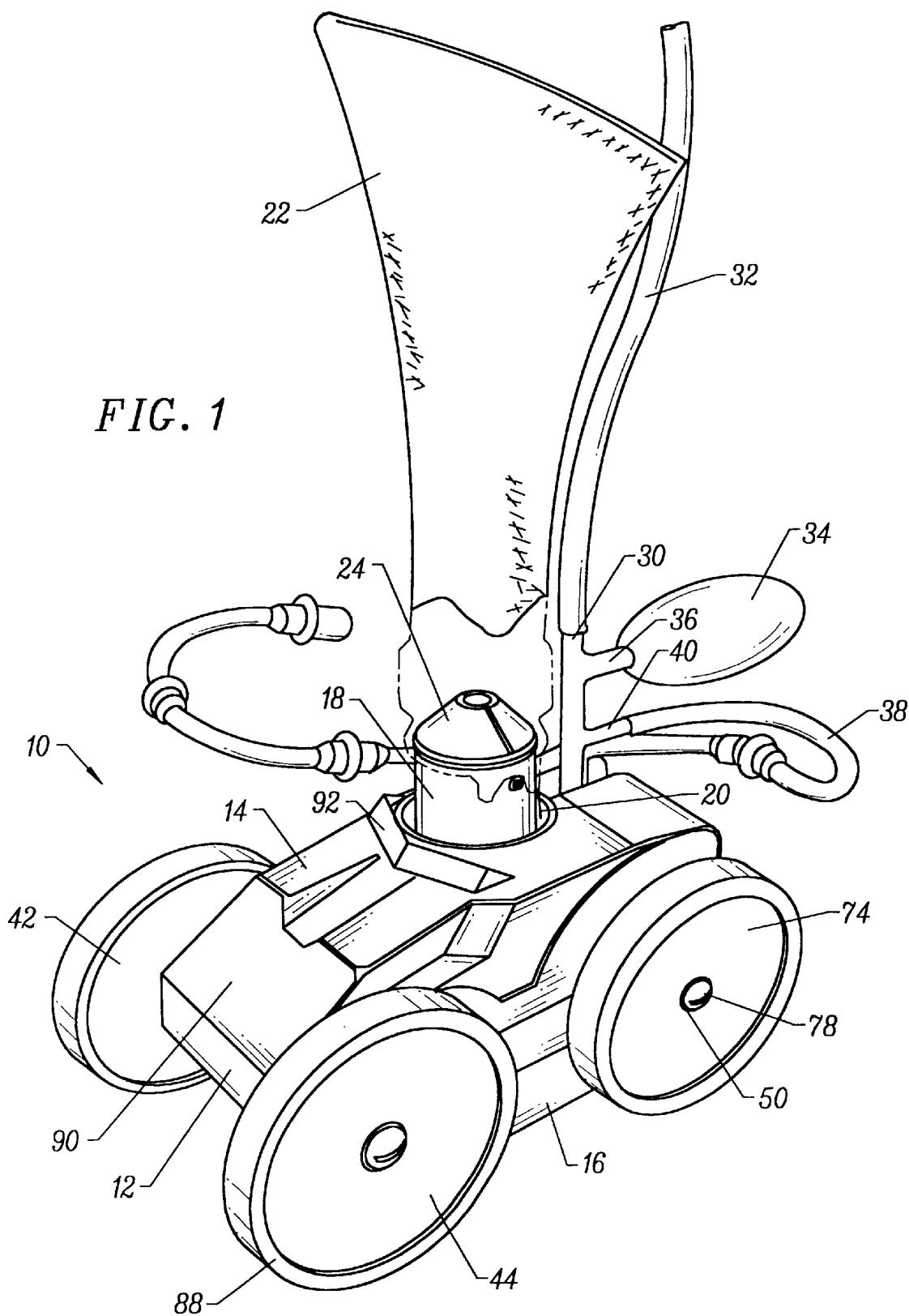
FIG. 1 is a perspective view of a first embodiment of an automatic swimming pool cleaner of the present invention, with a portion of the collection bag shown in phantom for purposes of illustration.

Also shown in FIGS. 2 and 3, and in accordance with a first embodiment of the present invention, is a float unit 150 secured adjacent to the top portion 120 and left side 112 of bag 100. Bag 100 may optionally include a second loop 142 to allow the bag to be coupled to the feed hose 32 of the cleaner such as that shown in FIG. 1. In one embodiment, float 150 is secured to bag 100 by a loop of suitable waterproof material 152 (such as plastic) which is itself sewn into seam 122 at upper portion 120 of bag 100. Float 150 may be comprised of any suitably buoyant material, or constructed as an air-filled float, in accordance with the present invention. In one embodiment, a particularly desirable float material comprises a closed-cell foam material which has a buoyance sufficient to support bag 100 under water in pool cleaning applications. In general, left side 112 comprises the portion of the bag which is furthest away from feed hose 32 and therefore not secured thereto. In alternative embodiments, the float may be positioned at alternative locations in the bag, depending on the shape of the bag and construction of the cleaner. It should be recognized that it would be relatively easy to empirically determine optimal placement of the float in the bag depending upon the shape of the bag and the manner in which the bag is coupled to the cleaner. All such various embodiments utilizing a buoyant float within a debris bag are contemplated as being within the scope of the invention. The various alternative types of bags and the number of placements which might occur therein are well too numerous to enumerate.

In addition, innumerable materials may be utilized as the float material of float 150. A closed-cell material is desirable since it can be punctured as shown in FIGS. 2 and 3 by a securing strap 152 without generally affecting the buoyancy of float 150. However, any number of suitable buoyant materials may be utilized so long as the buoyancy is sufficient to support the weight of the bag under water. Moreover, the size of the float may vary in accordance with the particular application, and again is easily empirically determined. All such various embodiments are contemplated as being within the scope of the present invention.

While the foregoing description of the invention has been shown as an exemplary embodiment using specific terms, the description is presented for illustrative purposes and it is Applicant's intention that changes and variations may be made without departure from the spirit or scope of the following claims.

What is claimed is:

1. A pool cleaner debris bag comprising:
   a porous material defining an interior cavity having a closable top end and an open bottom end, the bottom end coupled to the pool cleaner to receive debris from the pool ejected by the cleaner into the bag;
   a coupling connecting the bottom end to the cleaner;
   a float disposed within the interior cavity of the bag proximate the closable top end: and
   means joined to the top end for securing the float to the closable top end:
   wherein no portion of the float extends outside of the interior cavity.

2. The debris bag of claim 1 wherein said float has a buoyancy sufficient to support the weight of the bag in water.

3. The debris bag of claim 1 wherein the float is comprised of a small celled foam.

4. The debris bag of claim 1 wherein the float is comprised of a molded single cell float.

5. The debris bag of claim 1 wherein the float is comprised of a molded buoyant solid material.

6. The debris bag of claim 1 wherein the float is coupled to the bag by means of a ring secured to a seam of the bag.

7. The debris bag of claim 1 wherein the float is sewn into the bag.

8. The debris bag of claim 1 wherein the closable too end includes a top seam and the float is positioned at the top seam.

9. A pool cleaner bag, comprising:
   a substantially flexible porous material defining an inner cavity having a closed top end, a bottom end, a first side and a second side,
   means for securing the bottom end to the pool cleaner;
   a buoyant float apparatus secured in the inner cavity of the bag proximate the closed top end; and
   means joined to the closed top end for securing the float to the closed top end:
   wherein no portion of the float extends outside of the interior cavity.

* * * * *